United States Patent

[11] 3,592,472

| [72] | Inventor | Harry W. Kent<br>2306 Scottswood, Garland, Tex. 75040 |
|---|---|---|
| [21] | Appl. No. | 756,125 |
| [22] | Filed | Aug. 29, 1968 |
| [45] | Patented | July 13, 1971 |

[54] DOWEL DISPENSING AND RECEIVING INSTRUCTIVE TOY
6 Claims, 4 Drawing Figs.

[52] U.S. Cl. .................................................. 273/135 R,
273/136 C, 273/144 A, 35/22 A
[51] Int. Cl. .................................................. A63f 3/06
[50] Field of Search.......................................... 273/135 B,
136 E, 136 GB, 136 K, 144; 46/1 A; 124/49, 50; 35/22 A

[56] References Cited
UNITED STATES PATENTS

| 1,486,690 | 3/1924 | Scheliga | 273/144 (1) UX |
| 1,560,974 | 11/1925 | Clays | 273/144 (1) |
| 2,609,637 | 9/1952 | Spence | 46/1 (A) X |
| 2,623,303 | 12/1952 | Mindel | 35/22 (5) |
| 2,668,717 | 2/1954 | Staub | 273/144 (1) |
| 3,030,112 | 4/1962 | Scharp | 273/136 (GB) X |

FOREIGN PATENTS

| 539,030 | 11/1931 | Germany | 273/144 (1) |
| 177,625 | 8/1935 | Switzerland | 273/144 (1) |

Primary Examiner—Anton O. Oechsle
Attorney—Richards, Harris & Hubbard

ABSTRACT: A child's instructive toy having a number of dowels of various colors contained in an enclosed cavity therein, with a channel communicating with the exterior of the toy dimensioned to receive one dowel at a time and located at the bottom of the cavity, and with an ejector pin positioned slidably in the channel; holes arrayed in circles in the wedding-cake-shaped outside surfaces of the top are color coded to correspond with the colors of the dowels, so that dowels may be placed in a hole of corresponding color as they are ejected one by one from the cavity. A mode of play for the toy is provided which involves filing the holes in a predetermined sequence by ejection of dowels one at a time until a dowel of color of a hole to be filled has been ejected.

PATENTED JUL 13 1971 3,592,472

INVENTOR:

HARRY W. KENT

Richards, Harris & Hubbard

ATTORNEY

DOWEL DISPENSING AND RECEIVING INSTRUCTIVE TOY

This invention is related to children's toys and, more particularly, to instructive children's toys calling for the exercise of manual dexterity and color comprehension by the user, and adapted to an organized method of play.

The provision of toys and games which are amusing and which improve mental and physical skills are an important aspect of a child's development, particularly for children of preschool and early school age. It is highly desirable to expose children of such ages to diversions which promote higher levels of achievement while they are also providing entertainment and amusement.

Among the skills which particularly need to be cultivated in a child are those relating to manual dexterity, including muscular control and hand-eye coordination. The ability to manipulate physical objects with the hands and fingers is one which may be improved by frequent exposure to situations in which such abilities are required.

Color comprehension is another area of a child's development which often receives attention. Activities which encourage the realization of the fact of color differences, and which promote the recognition of the various colors are highly desirable. Further, such activities are particularly worthwhile where they call for set-to-set association of like colors.

While it is important to introduce a child to toys which promote his development, it is also important that such toys be enjoyable to the child. Toys or games which have both characters not only help to satisfy a child's demand for play activity, but also positively encourage the child to participate in activity valuable to skill development.

Particularly desirable is a toy which may be employed in a mode of play which requires of the child the discipline of conforming to established rules, and which provides for competition.

It is therefore an object of this invention to provide a toy for children which requires the exercise of manual and finger manipulations to promote coordination and dexterity.

A further object of this invention is the provision of a toy which can be used to encourage realization of color differences, recognition of various colors, and orderly association of like colors from different sets.

A still further object of this invention is to provide a child's toy which is both attractive and enjoyable to children, and which may be employed in a game or mode of play which presents a definite and coherent objective, which requires the following of rules, and which may be engaged in competitively by a number of children.

Yet another object of the present invention is to provide a toy possessing all the foregoing attributes which may be conveniently molded or extruded of a plastic material and which will be inexpensive to produce, lightweight and suitably safe for children's use.

In one aspect of this invention, a toy with dowel-receiving holes arrayed on its outer surfaces has an interior dowel-containing cavity. A channel dimensioned to receive one dowel runs through the toy at the bottom of the cavity, and the lower surfaces of the cavity slope down into the channel so that dowels in the cavity randomly self-load one at a time into the channel. Means for removing a dowel from the toy through the channel are provided, such as an ejector pin slidably resting in the channel.

A further aspect of this invention is the configuration of such a toy in an arrangement which lends itself to a systematic order of play, which is attractive to children, and which increases the manual and digital dexterity required to implace dowels thereon over that which would be required by other configurations.

In a further aspect of the invention, each of the holes on the outside of the toy is associated with one of a number of colors, and each dowel is associated with one of the colors.

In a still further aspect of the invention, a spring is provided on an ejector pin so that the pin is biased into a position out of the cavity so that, after a dowel is ejected, a new one will slip into the channel.

In yet another aspect of the invention, the dimensional relationship between the length of the channel, the length of the dowels, and the path of the ejector pin is such that the ejector pin is operable to push the dowel to protrude from the toy only a relatively short distance, requiring direct digital manipulation of the dowel for complete removal.

In a still further aspect of the invention, there is provided a method of playing with such a toy which incorporates the steps of filling the holes of the toy in a predetermined sequence with dowels of corresponding colors, by ejecting dowels one at a time from the toy until a dowel of the color associated with the next hole to be filled has been ejected.

For a more complete understanding of the present invention and for further objects and advantages thereof, reference may now be had to the following description taken in conjunction with the accompanying drawings in which.

Figure 1:
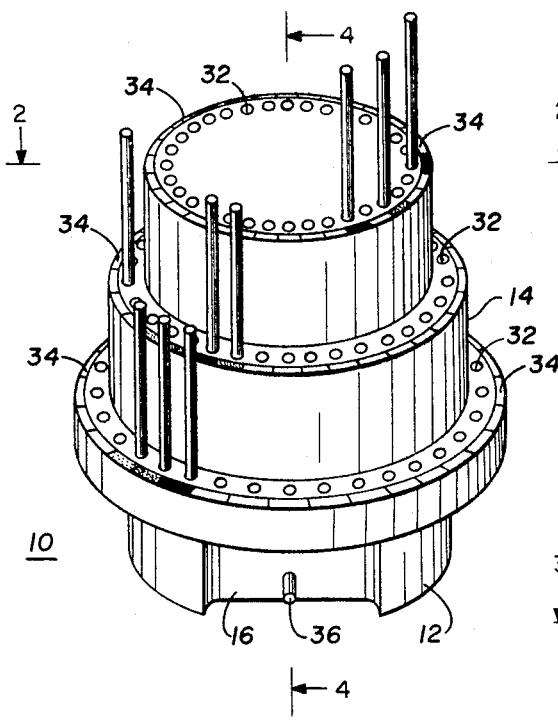
FIG. 1 is a perspective view of a toy embodying the present invention.
Figure 2:
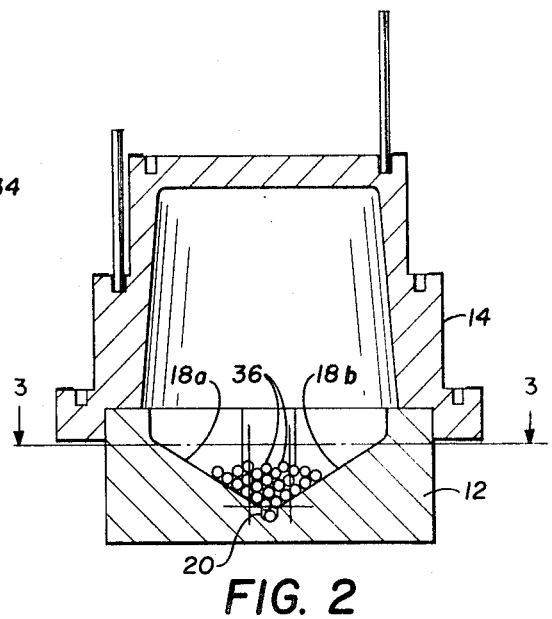
FIG. 2 is a sectional view taken along the line 2—2 in FIG. 1.

Referring now to the FIGS. a toy generally indicated by the reference numeral 10 has a base 12 and an upper member 14. The base 12 has a generally cylindrical shape, but with a recessed flat portion 16 forming a portion of the exterior vertical surface.

The base 12 contains a dowel cavity 18 having sides 18a and 18b which slope downward from the upper surface of base 12 toward the middle of the cavity. At the bottom of cavity 18, a dowel channel 20 runs diametrically through the base 12, communicating at both ends thereof with the exterior of the base 12.

Adjacent the cavity 18, the channel 20 has a segment of increased cross-sectional area forming a spring housing 22. Extending through the channel 20 and the spring housing 22 from the cavity 18 to the outside of the base 12 is an ejection pin 24. The ejector 24 is formed with a stop disc 26 which rides in spring housing 22, and which prevents the ejector 24 from sliding out of the base 12. An actuator button 27 is located on the outer end of ejector 24. A spring 28 surrounds the ejector 24 between stop disc 26 and the cavity 18, so that there is a constant pressure urging the ejector 24 outward from the cavity 18.

In order to assemble the toy, a vertical slot may be provided extending from the spring cavity 22 and channel 20 up through the top of base 12. After the ejector 24 and spring 28 are implaced, a closure 29 may be snapped into position to fill the slot, being retained by a suitable detent means.

The upper member 14 has an annular seat which is fitted over the base 12. The member 14 may be hollow so as to lessen the amount of material used in construction and to lighten the weight of the toy. The member 14 has a multitiered wedding cake configuration, with vertically displaced levels of decreasing diameter with increasing height. A circular array of relatively shallow dowel-receiving holes 32 is located at the periphery of each horizontal surface of the member 14. Accompanying each circle of holes 32 is a color ring 34, which is divided into segments equal in number to the number of holes in the circle. Each segment of a ring 34 is provided with a color, the ring preferably presenting an alternating array of colors.

Figure 3:
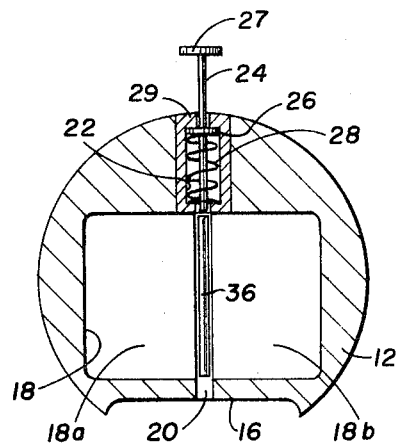
FIG. 3 is a sectional view taken along the line 3—3 in FIG. 2.

In operation, the upper member 14 may be removed from the base 12 to permit access to cavity 18. With upper member 14 removed, a number of dowels 36 are loaded into the cavity 18. Because of the configuration of cavity 18, with sides 18a and 18b sloping downward into channel 20, the dowels self-load one at a time into the channel 20. This condition is indicated in FIG. 3, with a dowel 36 in the channel 20, and the ejector 24 poised adjacent the cavity 18, with the stop disc 26 pressed against the outer end of spring housing 22.

Figure 4:
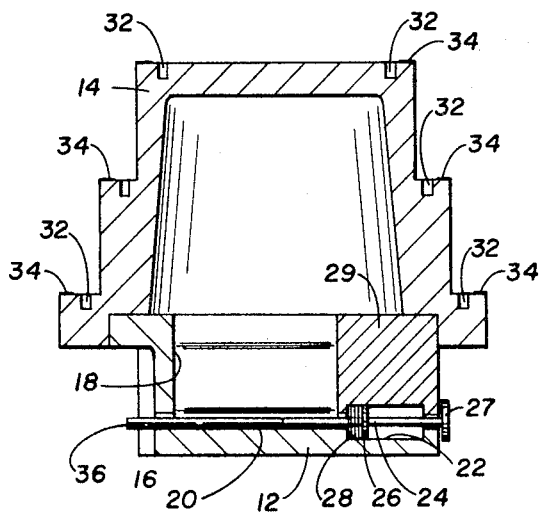
FIG. 4 is a sectional view taken along the line 4—4 of FIG. 1.

The dowel 36 may then be ejected, as shown in FIG. 4, by pressing in the plunger button 27, causing the ejector 24 to move dowel 36 along the channel to protrude from the base 12. The ejector pin 24 having pushed the dowel 36 partially out from the base 12, it is necessary for the operator to manually remove the dowel 36 the rest of the way. In order to require the maximum amount of manual dexterity, it may be desired to dimension the dowels 36 and ejector 24 such that the dowel 36 can be pushed out only a very short distance, thus increasing the difficulty of the task of removing the dowel 36.

After the pressure is removed from the ejector 24, the spring 22 causes the ejector 24 to return to its normal position out of cavity 18. As the ejector 24 leaves cavity 18, or upon the removal of partially ejected dowel 36, whichever occurs first by the operator's choice, a new dowel 36 will drop into the channel 20 in position for subsequent ejection.

While in this embodiment the spring has been provided to provide automatic retraction of the ejector 24, it may well be desired to omit such retracting means. In this aspect of the invention, the operator of the toy is required to retract the plunger 24 himself, thus preparing for another ejection.

It will also be appreciated that it may be desired to remove the ejector from its permanent placement in the base 12. An ejecting pin separate from the toy 10 could be used, and a child using the toy will be required to perform the step of inserting the ejector into the channel.

Once a dowel 36 has been removed from the base 12, it may be fitted into any of the holes 32 on the upper member 14, as are several dowels shown in FIG. 1. Each of the dowels is colored any one of the several colors corresponding to those on the color rings 34, so that the dowels may be matched up with holes adjacent color ring segments of like color.

In addition to, or in the alternative to, this arrangement for color association, there may be provided correspondence between the sets of holes and dowels as to any number of perceptable properties, such as size, shape or texture. Thus the matching of dowels to holes can involve the property as to which improvement of comprehension is desired, or any combination of several such properties.

The vertical spacing of the tiers on the upper member 14 and the dowels 36 is such that the dowels 36 in position on one level extend past the level of the holes on the next higher surface. Thus, when the lowest surface is filled with dowels first, it is more difficult to implace dowels in the next higher surface. The circle of holes in the next surface is closely surrounded by a ring of dowels, and is flanked on its inside by the vertical wall rising to the next surface. Thus, it is not possible to grasp the dowels at their lower ends while inserting them in holes on the second level. To implement this effect, the diameter of each tier should be less than that of the tier below only be enough to leave room for the color ring and holes on the next lower surface.

The toy just described may be used in a relatively simple game employing basic rules which will help to accustom young children to the discipline of following rules, and which will require the manual dexterity and color association ability of the child. The rules may be followed by a single player, or may be used in a contest among a number of players. The game may be started by a first player who ejects a dowel 36 from the base 12, and places it in any hole 32 of corresponding color in the lowest ring of the upper member 14. The next player must then fill a hole on either side of the already filled hole, and so ejects dowels from the dispenser one by one until a dowel of the appropriate color has been ejected.

Play continues in this manner, each player in turn being required to fill one of the two holes adjacent an already filled hole on the ring. If, on any turn, a player has already drawn a dowel of an appropriate color and has not used it, he may then use it; otherwise, he must draw until a playable dowel is ejected. After the lowest ring is filled, the second ring may be started as on the first ring, and play may continue as before. The game is concluded when all the rings are completed with dowels in every hole. If there has been a contest among several players, the player having the fewest number of ejected but unused dowels wins the game.

Having described the invention in connection with certain specific embodiments thereof, it is to be understood that further modifications may now suggest themselves to those skilled in the art and it is intended to cover such modifications as fall within the scope of the appended claims.

What I claim is:

1. A child's instructive toy comprising:

a plurality of dowels each identifiable as a member of one of at least two classes and having a length dimension substantially greater than the diametrical dimension, means for presenting the dowels in a random sequential order to a child, and surface means forming a plurality of bores, each adapted to hold one end of a dowel, each bore being identifiable with the dowels in one of the classes, the bores being arranged relative to each other such that dowels previously placed in the bores will interfere with the placement of dowels in adjacent bores.

2. The child's instructive toy of claim wherein the means forming the plurality of bores has a generally horizontal surface disposed adjacent a generally vertical surface extending upwardly therefrom, the bores being disposed in the horizontal surface adjacent the vertical surface such that the vertical surface interferes with the placement of the dowels in the bores by the child.

3. The child's instructive toy of claim 2 wherein the vertical surface extends upwardly to a height less than the height of a dowel held in the bores.

4. The child's instructive toy of claim 3 wherein the means forming the plurality of bores has a second generally horizontal surface at the upper end of the vertical surface, the second horizontal surface also containing bores disposed adjacent the vertical surface such that dowels disposed in the bores of the second surface will interfere with the placement of dowels in the bores of the lower surface.

5. The child's instructive toy of claim 1 wherein the means for presenting the dowels is an open-topped receptacle having a bottom adapted to rest on a supporting surface, and the means forming the plurality of bores rests on and forms a cover for the open-topped receptacle.

6. The child's instructive toy of claim 5 wherein the open-topped receptacle comprises a pair of downwardly converging generally planar walls terminating in a horizontal groove sized to receive only one dowel, and manually actuatable plunger means for ejecting a dowel in the groove at least to an extent to be grasped by the child.